US012639394B2

(12) United States Patent
Smith et al.

(10) Patent No.: US 12,639,394 B2
(45) Date of Patent: May 26, 2026

(54) APPARATUS AND METHOD FOR OPTIMIZATION USING DYNAMICALLY VARIABLE LOCAL PARAMETERS

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/609,563

(22) Filed: Mar. 19, 2024

(65) Prior Publication Data

US 2025/0298858 A1      Sep. 25, 2025

(51) Int. Cl.
*G06F 17/11*          (2006.01)
*G06N 20/00*          (2019.01)

(52) U.S. Cl.
CPC .............. *G06F 17/11* (2013.01); *G06N 20/00* (2019.01)

(58) Field of Classification Search
CPC .......... G06F 17/10; G06F 17/11; G06F 17/15; G06F 17/153; G06F 17/17; G06F 17/175; G06F 17/18; G06N 20/00–20; G06N 3/08–126
See application file for complete search history.

(56)                References Cited

U.S. PATENT DOCUMENTS 11,564,600 B2     1/2023   Liu
2007/0162301 A1*  7/2007   Sussman ................ G06Q 10/02
                                                        705/5
2009/0216571 A1*  8/2009   Sunshine ........... G06Q 30/0283
                                                        705/26.1
2012/0016718 A1*  1/2012   Kahn .................. G06Q 30/0202
                                                        705/7.31
2019/0180297 A1*  6/2019   Bhatia ................ G06Q 30/0206
2023/0076243 A1*  3/2023   Watt ........................ G06Q 40/08

FOREIGN PATENT DOCUMENTS

IN        202321053125 A    10/2023
WO        2020/178829 A1    9/2020

OTHER PUBLICATIONS

Hennessy, John L., et al. Computer Architecture : A Quantitative Approach, Elsevier Science & Technology, 2014. ProQuest Ebook Central,http://ebookcentral.proquest.com/lib/uspto-ebooks/detail. action?docID=404052. (Year: 2014).*

* cited by examiner

*Primary Examiner* — Andrew Caldwell
*Assistant Examiner* — Huy Duong
(74) *Attorney, Agent, or Firm* — Caldwell LLC

(57)                ABSTRACT

The apparatus employs adaptive machine learning for optimization using dynamically variable local parameters. It consists of a processor and memory. Initially, it access a first dataset corresponding to the first phenomenon and a second dataset corresponding to the second phenomenon. Then, it identifies a dependency relationship between at least one data cluster of the first phenomenon and at least one data cluster of the second phenomenon. Using the at least a processor, modify a processor, an attribute set, as a function of the second data cluster. Further, it optimize a target data cluster, as the function of the first phenomenon. Last, it modify using the at least a processor, the second data cluster as a function of the target data cluster.

18 Claims, 6 Drawing Sheets

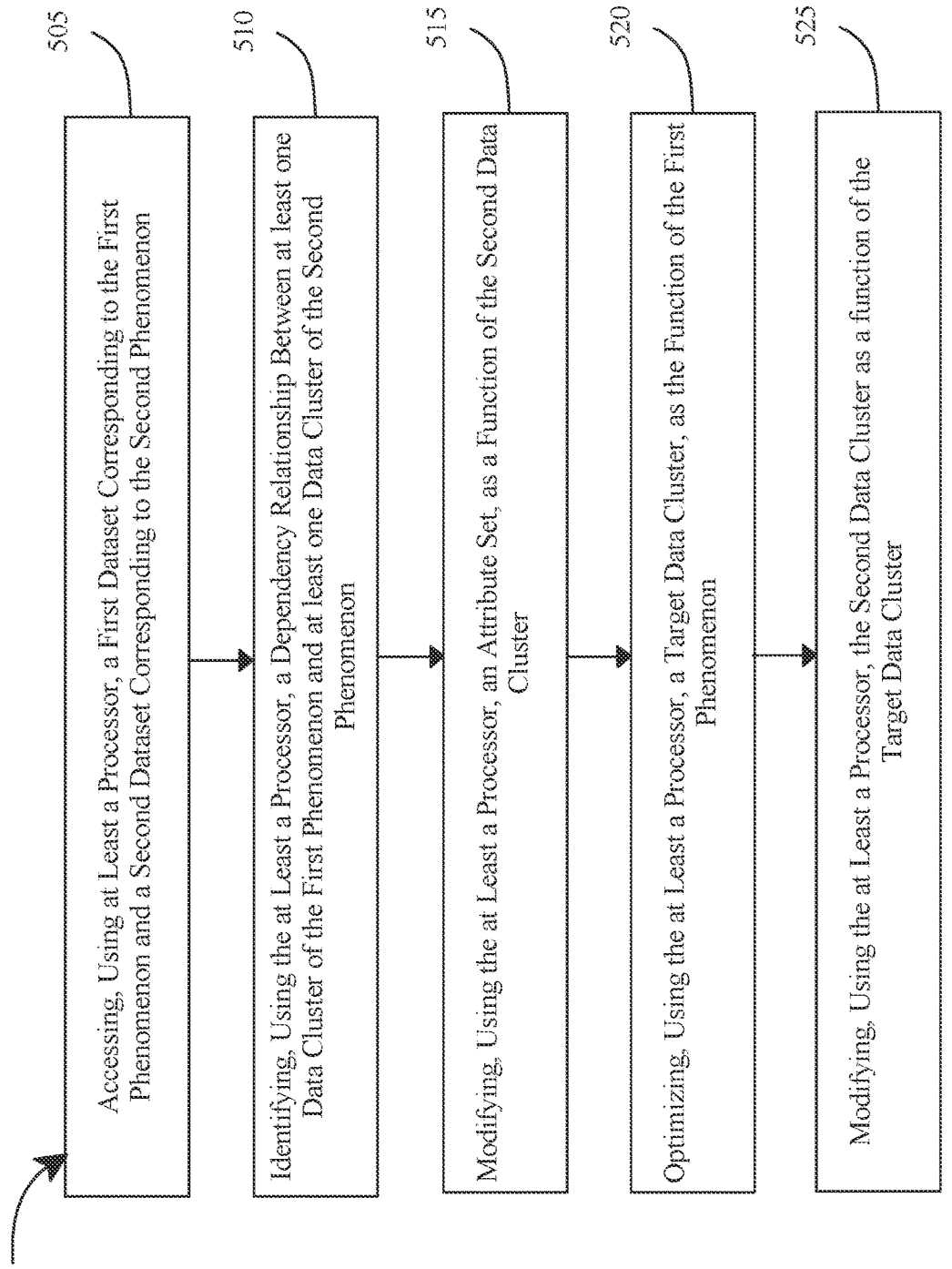

FIG. 5

505 — Accessing, Using at Least a Processor, a First Dataset Corresponding to the First Phenomenon and a Second Dataset Corresponding to the Second Phenomenon 510 — Identifying, Using the at Least a Processor, a Dependency Relationship Between at least one Data Cluster of the First Phenomenon and at least one Data Cluster of the Second Phenomenon 515 — Modifying, Using the at Least a Processor, an Attribute Set, as a Function of the Second Data Cluster 520 — Optimizing, Using the at Least a Processor, a Target Data Cluster, as the Function of the First Phenomenon 525 — Modifying, Using the at Least a Processor, the Second Data Cluster as a function of the Target Data Cluster

500

APPARATUS AND METHOD FOR OPTIMIZATION USING DYNAMICALLY VARIABLE LOCAL PARAMETERS

FIELD OF THE INVENTION

The present invention generally relates to the field of interposes communication. In particular, the present invention is directed to an apparatus and method for optimization using dynamically variable local parameters.

BACKGROUND

Many computer solutions to optimization problems focus on approximating computationally intractable or hard problems with local or otherwise more tractable sub-problems. This has the potential to save computational resources and time. These complex problems often require an inordinate amount of computational resources and time to solve optimally. In an attempt to manage these issues, many computer solutions approximate the original complex problems with more tractable sub-problems. While these approximations can reduce the computational burden, they frequently do not adequately capture the nuanced characteristics of the original problem space. This mismatch leads to sub-optimal solutions that may not meet the precise needs or constraints of the original problem, thus presenting a technical problem of achieving both computational efficiency and solution accuracy.

SUMMARY OF THE DISCLOSURE

In an aspect, an apparatus for optimization using dynamically variable local parameters is described. The apparatus includes at least a computing device comprising at least a processor and a memory, the computing device configured to access a first dataset corresponding to the first phenomenon and a second dataset corresponding to the second phenomenon, the computing device configured to identify a dependency relationship between at least one first data cluster of the first phenomenon and at least one second data cluster of the second phenomenon, the computing device configured to modify an attribute set as a function of the at least one second data cluster, the computing device configured to optimize a target data cluster as the function of the first phenomenon and the modified attribute set, and modify the at least one second data cluster as a function of the target data cluster.

In another aspect, a method for an for optimization using dynamically variable local parameters is described. accessing, using at least a processor, a first dataset corresponding to a first phenomenon and a second dataset corresponding to a second phenomenon, identifying, using the at least a processor, a dependency relationship between at least one first data cluster of the first phenomenon and at least one second data cluster of the second phenomenon, modifying, using the at least a processor, an attribute set, as a function of the at least one second data cluster, optimizing, using the at least a processor, a target data cluster, as the function of the first phenomenon and the modified attribute set; and modifying, using the at least a processor, the at least one second data cluster as a function of the target data cluster.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5 is a flow diagram illustrating an exemplary work flow in one embodiment of the present invention.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for optimization using dynamically variable local parameters. In an embodiment, a processor and memory work in conjunction to access, analyze, and optimize data clusters that inform user-specific recommendations.

Aspects of the present disclosure can be used to dynamically tailor self-improvement strategies that align with an individual's unique behavioral patterns and preferences. Aspects of the present disclosure can also be used to adjust these strategies in response to changing environmental conditions or user feedback, ensuring that the personal development plans remain relevant and effective over time. This is so, at least in part, because the disclosed apparatus and methods are capable of processing complex datasets and extracting actionable insights that directly contribute to the user's growth and adaptation to their personal and professional environments.

Figure 1:
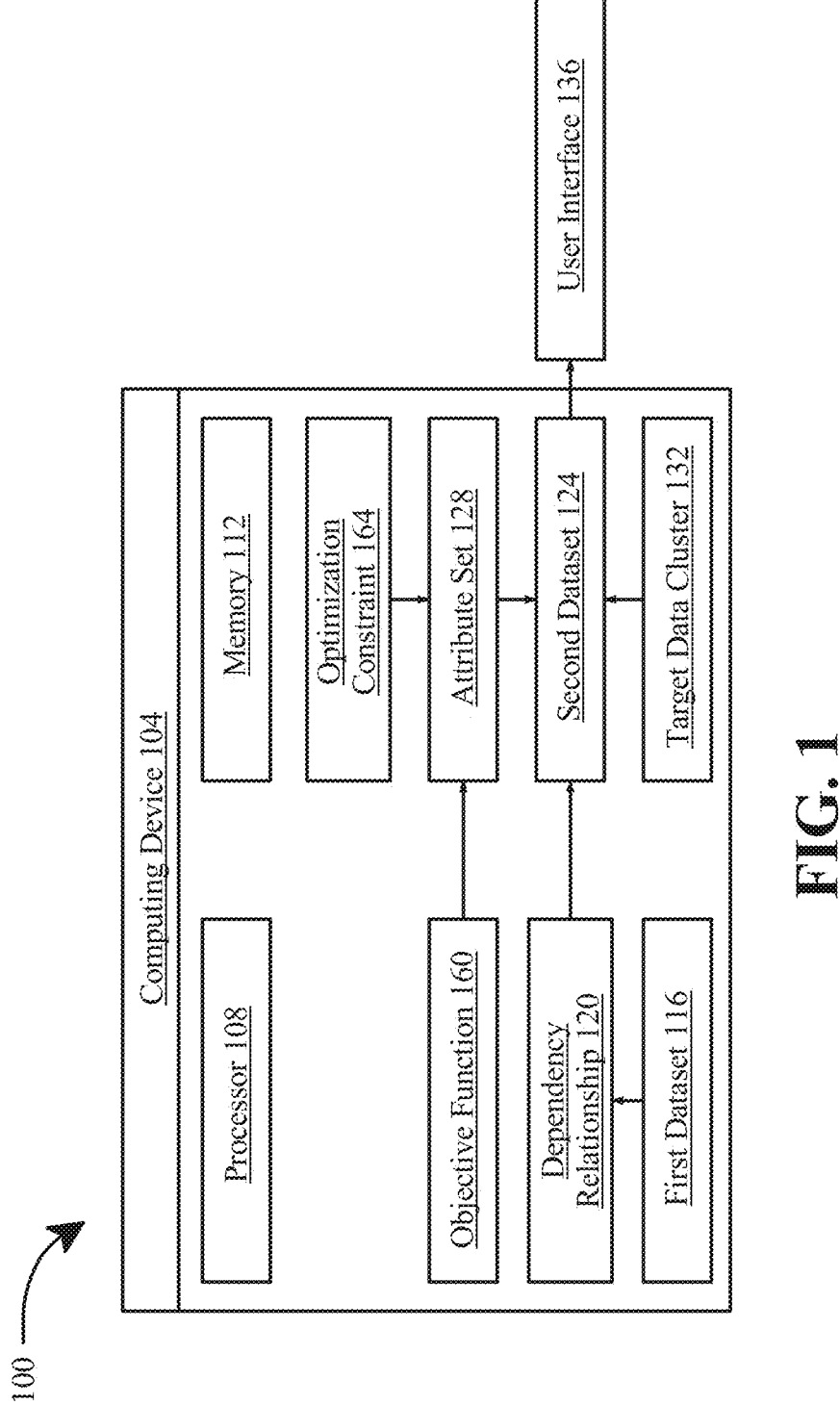
FIG. 1 is a block diagram of an exemplary apparatus for an developing a personalized self-development procedure is described.

Referring now to FIG. 1, an exemplary embodiment of an apparatus 100 for optimization using dynamically variable local parameters is illustrated. Apparatus includes a computing device. Computing device includes a processor communicatively connected to a memory. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, an apparatus 100 includes a memory 112 communicatively connected to at least a processor 108. For the purposes of this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, apparatus 100 and/or computing device may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, apparatus 100 for optimization using dynamically variable local parameters comprises at least one processor 108 and a memory 112 communicatively connected to the at least a processor 108, wherein the memory 112 containing instructions configuring the at least processor 108 to access a first dataset 116 corresponding to the first phenomenon and a second dataset 124 corresponding to the second phenomenon. As used in this disclosure, a "first dataset" contains information about a specific event, behavior, condition, or set of conditions, which considered the first phenomenon. For example, first dataset 116 could be a collection of user activity data on a website indicating the phenomenon being user engagement on the website. As used in this disclosure, a "second dataset" pertains to another distinct event or condition, for example, the second dataset 124 may include weather conditions if the impact of weather on user engagement is being analyzed. As used in this disclosure, "phenomenon" implies that the datasets are not just random collections of data but are related to observable events or occurrences that have significance or relevance to the context in which being studied or used.

With continued reference to FIG. 1, in an embodiment, apparatus 100 may be further configured to generate second data set 124 using a machine-learning process. As used in this disclosure, a "machine-learning process" is a computational method whereby algorithms analyze input data, learn from data patterns, and make data-driven predictions or decisions. Specifically, a generative machine-learning process can synthesize new datasets by understanding and mimicking the distribution of the input data, often leading to the creation of novel data points that share properties with the original data. In this disclosure, processor 108 may utilize a generative machine-learning model to interpret information about the first and/or second phenomena and generate a new set of goals, which constitutes the second dataset. Generate a new set of goals may be achieved by training the machine-learning model on existing data to identify underlying structures and sequences, and then using the model to extrapolate or generate new goal sequences that are in line with the modified input information. For example, processor 108 may take in data about a user's current professional skill set (first phenomenon) and their engagement with different learning modules (second phenomenon) to generate personalized career development goals. Similarly, processor 108 may analyze data from a user's completed projects and ongoing tasks to predict and set subsequent project milestones that align with their career trajectory. As a non-limiting example, processor 108 may use a generative model to analyze a business leader's decision-making patterns and market trends to generate strategic business goals that anticipate future industry movements. This generative approach may allow the machine-learning process to propose forward-thinking objectives that can guide users toward long-term success and growth.

With continued reference to FIG. 1, in an embodiment, wherein the first phenomenon may include user behavior data, processor 108 may be configured to execute machine learning algorithms to analyze interaction patterns, such as click-through rates, navigation paths, and time spent on various sections of an application or website. For instance, as a non-limiting example, processor 108 may apply a sequence mining algorithm to identify common sequences of actions that lead to a purchase or subscription, or employ a neural network to predict user engagement based on historical interaction data. The user behavior data may be sourced from web analytics tools, application logs, or customer relationship management (CRM) systems, providing a comprehensive view of user activities. Additionally, processor 108 may utilize natural language processing (NLP) to analyze user feedback or comments for sentiment analysis, further enriching the behavioral dataset with qualitative insights. Combination of quantitative and qualitative data analysis allows for a robust profile of user behavior phenomena, enabling processor to tailor user experiences and improve interface design based on predictive user behavior models.

With continued reference to FIG. 1, in an additional embodiment, modifying attribute set 128 may include adding an optimization constraint 164. As used in this disclosure, an "optimization constraint" is a condition or limitation specified in an optimization problem that the solution must satisfy. Constraints may be used in defining bounds within which an optimization process operates, ensuring that the outcomes are not only optimal but also feasible and within predefined parameters. Processor may be configured to modify attribute set 128 by incorporating optimization constraint 164 directly from second dataset 124 or by generating constraints through a machine-learning model that has been trained on second dataset 124. Process may involve defining limits on resources, setting minimum or maximum thresholds on variables, or specifying mandatory conditions that the optimization algorithm must adhere to. For example, second dataset may indicate that a user has a maximum of two hours per day to dedicate to professional development, processor 108 may add a time constraint to attribute set 128 to ensure the recommended activities do not exceed this limit. Another example may be setting a constraint on the minimum required skill level for suggested learning modules, based on the user's current competency as determined by second dataset. As a non-limiting example, processor 108 may analyze business performance data (second dataset) to generate financial constraints, such as budget limits for proposed marketing strategies. Apparatus 100 may ensure that the optimization of marketing initiatives aligns with the company's financial capabilities and strategic objectives.

With continued reference to FIG. 1, in other embodiment, modifying attribute set 128 may include removing an optimization constraint. Processor 108 may be configured to reassess and modify attribute set 128 by lifting certain constraints that may no longer be relevant or may be impeding the attainment of optimal solutions. This may be based on new data indicating that previous limitations are overly restrictive or based on to explore new solution pathways. For example, dependency relationship identified by processor 108 between second data cluster and career growth metrics reveals a positive correlation between the number of attended professional networking event and career advancement, original optimization constraint 164, which may limit event attendance, may be reassessed. Upon determining an increased number of event attendances results in a greater improvement in career related metrics within second dataset, processor may modify attribute set 128 to eliminate or adjust the cap. Adjustment may be made by analyzing variations in second data cluster, comparing the outcomes with and without the cap on networking events, and observing a more substantial increase in the desired metrics when the cap is removed, thereby optimizing the target data cluster. Similarly, second data cluster may indicate a shorter study sessions correlate with better learning outcomes, processor may revise the minimum duration constraint within the attribute set 128. Revise may be done by simulating scenarios with varying study session lengths and observing impact on the learning metrics within second data cluster. If the simulation shows a shorter sessions yield better results, processor may then reduce or remove the minimum time constraint to align with these findings. As a non-limiting example, processor 108 may evaluate the financial constraints on a business's operational expenditures. As a non-limiting example, processor 108 may also evaluate the financial constraints on a business's operational expenditures. The analysis of the second data cluster may show that increased investment in research and development correlates with positive innovation metrics processor may relax spending constraints in the attribute set 128. Decision may be informed by a predictive analysis of spending increases within second data cluster, which, when allowed to fluctuate beyond the original constraint, demonstrate a stronger contribution to innovation and long-term growth.

With continued reference to FIG. 1, in an embodiment, modifying attribute set 128 may include generating an objective function 160. As used in this disclosure, an "objective function" is a mathematical expression that defines a goal of an optimization process, typically formulated to be either maximized or minimized. An objective function may quantify a performance of a solution in terms of a set of variables and may provide a scalar value that an optimization algorithm may seek to improve; an optimal set of values for variables of the objective function may result, such as values corresponding to potential values in first dataset, which may be recommended and/or selected as a result by processor. Processor may be configured to formulate and/or update objective function 160 based on a current attribute set 128, which may represent a user's profile, behavior, and preferences. Analytical methods may be employed to determine the most relevant factors that should be included in objective function 160, ensuring that it accurately reflects the desired outcomes of the user. For instance, in a professional development context, objective function 160 may be designed to maximize the user's skill acquisition rate while minimizing the time investment. Another example may be objective function 160 that aims to maximize a user's engagement with a learning platform by considering factors like relevancy of content and a user's interaction patterns.

With continued reference to FIG. 1, computing device may generate a k-means clustering algorithm receiving unclassified physiological state data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related physiological data, which may be provided with user cohort labels; this may, for instance, generate an initial set of user cohort labels from an initial set of user physiological data of a large number of users, and may also, upon subsequent iterations, identify new clusters to be provided new user cohort labels, to which additional user physiological data may be classified, or to which previously used user physiological data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $argmin_{ci \ni c} dist(ci, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $ci=1/|Si|\Sigma xi \ni Si^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected physiological data set. Degree of similarity index value may indicate how close a particular combination of genes, negative behaviors and/or negative behavioral propensities is to being classified by k-means algorithm to a particular cluster. K-means clustering algorithm may evaluate the distances of the combination of genes, negative behaviors and/or negative behavioral propensities to the k-number of clusters output by k-means clustering algorithm. Short distances between a set of physiological data and a cluster may indicate a higher degree of similarity between the set of physiological data and a particular cluster. Longer distances between a set of physiological behavior and a cluster may indicate a lower degree of similarity between a physiological data set and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between a physiological data set and the data entry cluster. Alternatively or additionally k-means clustering algorithm may select a plurality of clusters having low degree of similarity index values to physiological data sets, indicative of greater degrees of similarity. Degree of similarity index values may be compared to a threshold number indicating a minimal degree of relatedness suitable for inclusion of a set of physiological data in a cluster, where degree of similarity indices a-n falling under the threshold number may be included as indicative of high degrees of relatedness. The above-described illustration of feature learning using k-means clustering is included for illustrative purposes only, and should not be construed as limiting potential implementation of feature learning algorithms; persons skilled in the art, upon reviewing the entirety of this disclosure, will be aware of various additional or alternative feature learning approaches that may be used consistently with this disclosure.

With continued reference to FIG. 1, in an embodiment, generating objective function 160 may include selecting, using a machine-learning model, a variable set, and generating the objective function using the selected variable set. Generating objective function 160 may involve employing feature learning techniques within a machine-learning model to determine which aspects of first dataset 116 have strong correlations or linkages to elements within second dataset 124. These relevant aspects are then selected as variables for objective function 160. Processor may be configured with a feature selection algorithm that sifts through the data, identifies statistically significant features, and determines their suitability as variables based on their influence on the outcomes of interest. Once the variable set may be defined, processor 108 may integrate these variables into the formulation of objective function 160, which may then be used to guide the optimization process. For example, processor 108 may use a feature learning model to identify which user interaction metrics, such as session length or content completion rate, are most predictive of a user's progress in a digital learning environment. These metrics may become variables in an objective function designed to maximize learning efficiency. Aa a non-limiting example, processor 108 may analyze historical business performance data and current market trends to select key performance indicators like market share growth or cost-efficiency ratios as variables. Variables may be used to generate an objective function that guides the company in strategic decision-making to enhance competitive standing and operational effectiveness.

With continued reference to FIG. 1, generating objective function may include receiving a variable set. As used in this disclosure, a "variable set" is the collection of variables that are incorporated into the objective function of an optimization model. Variables may be the specific elements from dataset that the optimization algorithm can adjust in order to find the most effective solution, directly impacting the performance metric or metrics that objective function may be designed to either maximize or minimize. These variables are the elements that may be manipulated during the optimization process. Variables may be derived from characteristics, features, or metrics that are indicative of performance within the context of the apparatus operational domain, and may be identified because of the significant impact on the personal development objectives of the user. Wherein generating objective function 160 may further include initializing a coefficient set corresponding to the variable set, and tuning the coefficient set using a machine-learning algorithm. As used in this disclosure, a "coefficient set" refers to the numerical multipliers assigned to each variable within the objective function. Each coefficient may scale the corresponding variable, impacting the magnitude of that variable's effect on the outcome of objective function. In addition to coefficients, objective function may also include bias terms, which may be constants added to the product of variables and coefficients, further influencing the function's output and thus the optimization solution. Coefficients weight the importance of each variable within objective function 160, essentially determining the degree to which each variable will influence the overall calculation of the function. The initial values of these coefficients may be based on heuristics, domain knowledge, or previous models, and are adjusted or "tuned" through the machine-learning algorithm to find the optimal values that minimize objective function 160. Tuning process may involve using techniques such as gradient descent or evolutionary algorithms to iteratively adjust the coefficients based on model performance, ultimately converging on a set of coefficient values that yield the best solution as defined by objective function 160.

With continued reference to FIG. 1, in another embodiment, wherein the second phenomenon may include an environmental factor influencing the user behavior. As used in this disclosure, an "environmental factor" is any external variable that may affect how users interact with a system. Environmental factor may encompass physical, social, cultural, or economic environments. Processor 108 may be equipped with sensors or data collection mechanisms to gather environmental data, such as time of day, location, weather conditions, or current events that might affect user engagement. For instance, processor 108 may adjust the content delivery or interface presentation based on these factors to enhance user interaction. It could present more engaging tasks during times of day when user energy is typically higher, or suggest indoor activities when the weather outside is unfavorable. As an example, apparatus may identify that a user's activity levels are lower on days with inclement weather, processor may respond by suggesting mood-boosting activities recognized to counteract the impact of weather on the user's emotional state. A non-limiting example would be processor triggering motivational notifications or displaying more vibrant and stimulating content during such weather conditions to encourage user engagement. This adaptability helps tailor the user experience to not only align with personal goals but also to be responsive to the changing environmental context, thereby supporting continuous self-improvement irrespective of external conditions.

Still referring to FIG. 1, processor 108 is further configured to identify a dependency relationship 120 between at least one data cluster of the first phenomenon and at least one data cluster of the second phenomenon. A "dependency relationship," as used in this disclosure, is change in one data cluster that is associated with or caused changes in another. Processor 108 may identify the relationship by applying statistical analysis or machine learning algorithms that may detect correlations, patterns, and trends across the two data clusters. Regression analysis, correlation coefficients, or advanced predictive models may be used to establish the strength and nature of the relationship. For example, processor 108 may find user's activity levels (first phenomenon) are consistently higher shortly after engaging with motivational content (second phenomenon). As a non-limiting example, processor may discovery users are more likely to exercise after reading articles about health benefits related to physical activity. By identifying such dependency relationship 120, processor 108 can inform the timing and type of content delivered to the user to encourage beneficial behaviors, thus enhancing the efficacy of a self-improvement program.

With continued reference to FIG. 1, in some embodiment, wherein identifying dependency relationship 120 may include determining the strength and direction of the correlation between the clusters. As used in this disclosure, the "strength" of the correlation refers to how closely the data clusters are related or how much one cluster may predict variations in another, often measured by statistical metrics such as the correlation coefficient. As used in this disclosure, the "direction" may indicate whether the relationship is positive (both clusters increase or decrease together) or negative (one cluster increases as the other decreases). Processor 108 may determine the strength and direction of the correlation by executing statistical algorithms designed for correlation analysis, such as Pearson's or Spearman's correlation coefficients, or by using machine learning models that may handle more complex, non-linear relationships. Processor 108 may analyze large volumes of data points within each cluster, compute the correlation metrics, and then interpret these metrics to understand the relationship. For example, processor 108 may analyze user engagement data (first cluster) and promotional campaign data (second cluster) to see if there is a correlation between the timing of campaigns and user activity spikes. A non-limiting example may be processor finding a strong positive correlation between users reading motivational content in the morning (second cluster) and an increase in productivity-related activities throughout the day (first cluster). Such insights enable the apparatus to make data-driven decisions on when to present certain types of content to maximize user engagement and support behavior change.

Still referring to FIG. 1, processor 108 is further configured to modify attribute set 128 as a function of the second data cluster. Apparatus 100 may involve adjusting the variables or characteristics within a user's profile, which may be determined by attribute set 128, based on the insights derived from analyzing the second data cluster. Modification performed by processor 108 may apply a set of rules or algorithms that determine how the attributes should be altered to enhance the personal development process. As used in this disclosure, "attribute set" is a collection of variables or characteristics that define and describe specific aspects of user's profile or behavior within apparatus 100. These attributes may encompass a wide range of data points, such as demographic information, user preferences, behavior patterns, interaction history, and performance metrics. Attribute set 128 may serve as a foundational element for apparatus 100 processing algorithms, informing how the system interacts with, responds to, and personalizes experiences for the user. Each attribute within the set may be quantitatively or qualitatively measured and is subject to modification based on apparatus 100 analysis of user data and external factors. This dynamic and adaptable nature of attribute set 128 may allow a tailored and evolving user experience, aimed at optimizing personal development and engagement with the apparatus. Processor 108 may be configured to carry out the modifications by executing data-driven decision-making algorithms. These algorithms might include rule-based systems that trigger changes to the attribute set when certain conditions within the second data cluster are met or machine learning models that learn from the data how best to adjust the attributes for optimal outcomes. For example, processor 108 may modify attribute set 128 that controls content delivery based on user interaction patterns with educational material (second data cluster), such as increasing the complexity of the material as user proficiency grows. Another example may be adjusting the frequency and timing of reminder notifications for exercise based on the user's responsiveness to prompts (second data cluster) to improve adherence to a fitness routine. A non-limiting example related to self-improvement without explicitly mentioning motivational techniques may involve processor 108 adjusting the difficulty level of cognitive skill games within attribute set 128 based on the user's performance data cluster. If the data indicates that the user is consistently performing at a high level, processor 108 may increase the game's difficulty to continuously challenge and develop the user's cognitive abilities.

With continued reference to FIG. 1, in an embodiment, wherein modifying attribute set 128 of the second data cluster may include altering the environmental factors. Process may involve changes to the variables within apparatus 100 that may be influenced by or related to the user's external context. These environmental factors may be variables that apparatus has determined have an impact on user behavior, such as time of day, weather conditions, or current social events. Processor 108 may be configured to modify the attributes of the second data cluster by first analyzing the user's interaction data in relation to these environmental factors and then adjusting apparatus 100 response or content accordingly. Configuration may be done through programmed algorithms that take into account the statistical significance of environmental impacts on user behavior as revealed by the data analysis. For example, user interaction data may indicate increased engagement with productivity tools during typical business hours, processor 108 may alter attribute set 128 to prioritize notifications about time management articles or software updates at these times. Conversely, during off-peak hours or weekends, attribute set 128 may be adjusted to suggest content related to long-term business strategy and planning, when users may have more time for in-depth analysis and reflection. Another example may include tailoring the delivery of professional development resources based on user interaction with various business tasks. If a user frequently engages with marketing-related content, attribute set 128 may be adjusted to present advanced marketing analytics tools or case studies to further user's expertise in that area. As non-limiting example, processor 108 may modify attribute set 128 to provide customized business news feeds, market trends, and networking event notifications during periods of significant industry shifts or leading up to major economic announcements. Targeted content delivery may aim to keep the user well-informed and strategically aligned with business opportunities and industry developments.

Still referring to FIG. 1, processor 108 is further configured to optimize a target data cluster 132 as a function of the first phenomenon. As used in this disclosure, "optimize" is the process of making something as effective, perfect, or functional as possible. Processor 108 may be configured to optimize something; it is typically programmed to analyze current condition and make adjustments to improve performance or outcomes. Optimization involves computational procedures that may include evaluating efficiency, enhancing speed, reducing waste, increasing accuracy, or achieving better user satisfaction. Algorithms used for optimization may vary widely, from simple rule-based logic to complex machine learning models that adjust parameters in real-time to achieve the desired results. As used in this disclosure, a "target data cluster" is a subset of data within a larger dataset that has been grouped together because of shared characteristics or behaviors. "Clustering," as used in this disclosure, may be a method used to segment data into more manageable or understandable parts. A data cluster might be targeted for analysis or optimization because it represents a key area of interest or opportunity. For instance, target data cluster 132 in a business application may contain data related to customer purchasing habits. The "target" aspect implies that specific interventions or analyses are directed at target data cluster 132 with the intent to derive insights or improve performance related to that data group. Therefore, as used in this disclosure, "optimizing a target data cluster" may be refining and enhancing processor's to a specific collection of data points or attributes that are crucial for achieving a desired outcome, which in this case is determined by or related to user behavior patterns (the first phenomenon). Processor 108 may accomplish a desired outcome by analyzing the attributes within target data cluster 132-1-2-8, determining which aspects correlate most strongly with positive user behaviors, and then making adjustments to emphasize or strengthen these attributes. Apparatus 100 may involve applying statistical models, machine learning algorithms, or heuristic methods to assess and incrementally improve the performance or relevance of the data cluster with respect to the user's engagement or productivity. For example, the first phenomenon may indicate users are most responsive to personalized business insights in the morning, processor may optimize target data cluster 132 to ensure that personalized content is prioritized during these hours. As another example, if user data shows a high correlation between the use of a particular business analytics tool and increased sales performance, processor may optimize target data cluster 132 by suggesting similar tools or resources that might yield comparable benefits. Aa a non-limiting example, processor may adjust target data cluster to prioritize customer feedback management tools within a business's CRM system during periods of high customer interaction, such as after product launches or marketing campaigns. This optimization ensures that the business capitalizes on real-time customer insights to improve product offerings and customer service strategies.

With continued reference to FIG. 1, in an embodiment, wherein optimizing target data cluster 132 may include enhancing characteristics of first data cluster that contribute to a desired user outcome. As used in this disclosure, an "enhancing characteristics" is the improvement or amplification of certain data points or metrics within first data cluster that are positively correlated with user objectives or satisfaction. Processor 108 may achieve optimization by initially identifying key attributes within first data cluster that drive successful results. It may then apply algorithmic adjustments to these attributes, such as increasing the weight in decision-making models or improving their visibility in user interfaces 136, thereby potentially magnifying their positive impact on the user's experience or performance. For example, the desired user outcome may be increased engagement with a business intelligence platform, processor 108 might enhance characteristics such as the accessibility of high-impact visual data representations or the responsiveness of interactive data dashboards that have been shown to drive user interaction. Another example may involve processor 108 augmenting features like personalized report generation or notification settings that, according to user behavior analytics, lead to more consistent platform utilization. As a non-limiting example, processor 108 may include identifying timely responses to user queries in a customer service portal (first data cluster) lead to higher customer satisfaction scores. In optimizing target data cluster 132, processor 108 may enhance the responsiveness characteristic by allocating more apparatus resources to the query response function during peak hours, ensuring that user inquiries are addressed more quickly.

With continued reference to FIG. 1, in another embodiment, wherein optimizing target data cluster 132 may include measuring against predefined performance metrics aligning with the user's personal development objectives. Processor 108 may be used to establish benchmarks to evaluate and enhance the effectiveness of target data cluster

132. Performance metrics may be quantifiable indicators that have been predetermined to reflect the user's goals and aspirations within a personal development framework. Processor 108 may systematically compare current data within target data cluster 132 to these benchmarks. If the data falls short of the metrics, processor 108 may initiate modifications to the data cluster to improve performance. Initiating modification to the data cluster may involve reconfiguring algorithms, adjusting user interface elements, or personalizing content to better align with the user's objectives. For example, if a user's objective is to increase proficiency in a new language, performance metrics may include the number of new words learned per week or the time spent in language practice sessions. Processor 108 may track performance metrics and adjust the learning modules to focus more on areas needing improvement. Another example may be a user aiming to enhance their professional networking. Performance metrics may be the number of new connections made or interactions within a professional networking platform. Processor 108 may optimize the data cluster by suggesting peak times to connect with others or recommending networking events based on the user's industry and interests. As a non-limiting example, a user may be strived to develop public speaking skills. The performance metrics may include audience engagement levels during presentations or the number of speaking engagements booked. Processor 108 may optimize target data cluster 132 by analyzing feedback data to personalize development content that helps the user address specific areas for improvement in their public speaking abilities.

Still referring to FIG. 1, processor 108 is further configured to modify the second data cluster as a function of the target data. Processor 108 may adjust the variables or elements within the second cluster based on analysis and insights derived from target data cluster 132, which may contain critical user-specific information. The modifications may be data-driven, aiming to enhance the user experience or achieve specific outcomes by tailoring apparatus behavior or content presentation. Processor 108 may modify the second data cluster by analyzing how changes in the target data correlate with user behavior or preferences. It may use statistical methods, machine learning models, or algorithmic decision trees to dynamically adjust the second data cluster, ensuring that it is responsive to the evolving patterns observed in the target data. For example, the target data may suggest that users are most active on a professional development platform during certain hours, processor 108 may modify the second data cluster by scheduling the release of new content or interactive sessions during these peak times to maximize engagement. Another example may involve processor 108 adjusting recommendation algorithms within the second data cluster to prioritize skill development opportunities that users have shown a strong interest in, as indicated by the target data. As a non-limiting example, processor 108 may alter the communication preferences in the second data cluster based on user interaction frequencies with different communication channels in the target data. If a user frequently engages with email campaigns but not social media notifications, processor 108 may enhance email communication strategies while scaling back social media alerts.

With continued reference to FIG. 1, in an embodiment, wherein apparatus may further be configured to predict the impact the changes in the second data cluster on the optimization of target data cluster 132 in the first phenomenon. The predictive functionality may involve processor 108 using historical data, trend analysis, and predictive modeling to forecast how adjustments within one set of data will influence the performance or state of another set. Processor 108 may be configured with predictive analytics capabilities, which may include time series analysis, regression models, or machine learning algorithms like neural networks or decision trees. Processor 108 may simulate potential future scenarios based on the proposed changes to the second data cluster and their expected influence on first data cluster, thus enabling the apparatus to make informed decisions about which modifications will most effectively achieve the desired optimization. For example, the second data cluster may pertain to the timing and frequency of professional development notifications sent to users, processor 108 may predict how altering these parameters might affect user participation in development activities, which is part of target data cluster 132. Another example may involve processor 108 forecasting how changes in content delivery formats within the second data cluster (such as interactive vs. static content) may impact user engagement metrics in target data cluster 132. As a non-limiting example, processor 108 may predict the impact of introducing new business intelligence tools (second data cluster) on user decision-making processes and subsequent business outcomes (target data cluster). By understanding the potential influence of these tools, processor 108 may optimize the presentation and integration of the tools to align with users' operational patterns and strategic objectives.

With continued reference to FIG. 1, in another embodiment, wherein predicting the impact of changes in the second data cluster further comprises predicting the impact of changes in the first data cluster as a function of a hypothetical adjustment to the second cluster. Processor 108 may conduct a what-if analyses, where it may model potential outcome based on simulated changes in the data clusters. Simulated changes may cause hypothetical adjustments in one area (the second cluster) and it may influence outcomes in another area (the first cluster). Processor 108 may be equipped with simulation software or predictive modeling algorithms that may project the outcomes of various scenarios. Processor 108 may use historical data patterns, current trends, and statistical probabilities to forecast the results of potential changes. Predictive capability may allow for strategic planning and risk assessment before actual changes are implemented. For example, processor 108 may evaluate how increasing the frequency of customer feedback requests (a change in the second data cluster) could affect customer satisfaction rates (the first data cluster). Another example may be simulating the effect of modifying marketing campaign targets (second cluster) on sales conversion rates (first cluster). As a non-limiting example, processor 108 may assess how the introduction of a new business analytics feature (hypothetical adjustment to the second cluster) may influence user adoption rates and subsequent data utilization patterns (impact on the first data cluster).

With continued reference to FIG. 1, in an additional embodiment, wherein apparatus 100 may be further configured to communicate a recommendation provided to user interface 136 for user actions as a function of the optimization of the data cluster. Apparatus 100 may utilize the computational resources to generate actionable insights or suggestions based on the data analysis and subsequent optimization processes it has performed. Processor 108 may be configured to translate the results of data optimizations into practical recommendations, which may then be conveyed to the user through an interface. This may be done by using algorithms that can interpret the optimized data and deduce steps that users can take to align with their personal or professional development goals. Interface may include, but not limited to a dashboard, app, or notification system, may be designed to present these recommendations in a user-friendly and accessible manner. For example, data optimization may reveal a user's most productive time is morning hours, apparatus 100 may recommend scheduling the most challenging tasks for that time. Another example may be suggesting the user attend specific networking events if the optimized data indicates these have previously led to beneficial professional connections. As a non-limiting example, apparatus 100 may recommend specific online courses or reading materials to a user looking to improve their business acumen, based on an optimization of their past learning behaviors, and expressed interests in certain business topics. These recommendations may be tailored to facilitate the user's continuous learning and professional growth.

With continued reference to FIG. 1, in one or more embodiments, computing device may implement one or more aspects of "generative artificial intelligence(AI)," a type of AI that uses machine learning algorithms to create, establish, or otherwise generate data such as, without limitation, personalized development goals, tailored learning content, user-specific behavioral prompts and/or the like in any data structure as described herein (e.g., text, image, video, audio, among others) that is similar to one or more provided training examples. In an embodiment, machine learning module described herein may generate one or more generative machine learning models that are trained on one or more set of training data comprising user interaction histories, performance metrics, content engagement patterns, and environmental context data. These models synthesize new datasets that can inform the customization of the user's development pathway within the apparatus's ecosystem. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

Still referring to FIG. 1, in some cases, generative machine learning models may include one or more generative models. As described herein, "generative models" refers to statistical models of the joint probability distribution $P(X, Y)$ on a given observable variable x, representing features or data that can be directly measured or observed (e.g., user engagement times, frequency of application usage, types of content accessed) and target variable y, representing the outcomes or labels that one or more generative models aims to predict or generate (e.g., likelihood of achieving a specific skill level, potential for increased user retention, probability of content virality). In some cases, generative models may rely on Bayes theorem to find joint probability; for instance, and without limitation, Naïve Bayes classifiers may be employed by computing device to categorize input data such as, without limitation, demographic information, user interaction logs, and content consumption patterns into different classes such as, without limitation, user proficiency levels, engagement segments, or content popularity tiers.

In a non-limiting example, and still referring to FIG. 1, one or more generative machine learning models may include one or more Naïve Bayes classifiers generated, by computing device, using a Naïve bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing Device may then calculate a likelihood table by calculating probabilities of different data entries and classification labels. Computing device may utilize a naïve Bayes equation to calculate a posterior probability for each class. A class containing the highest posterior probability is the outcome of prediction.

Figure 2:
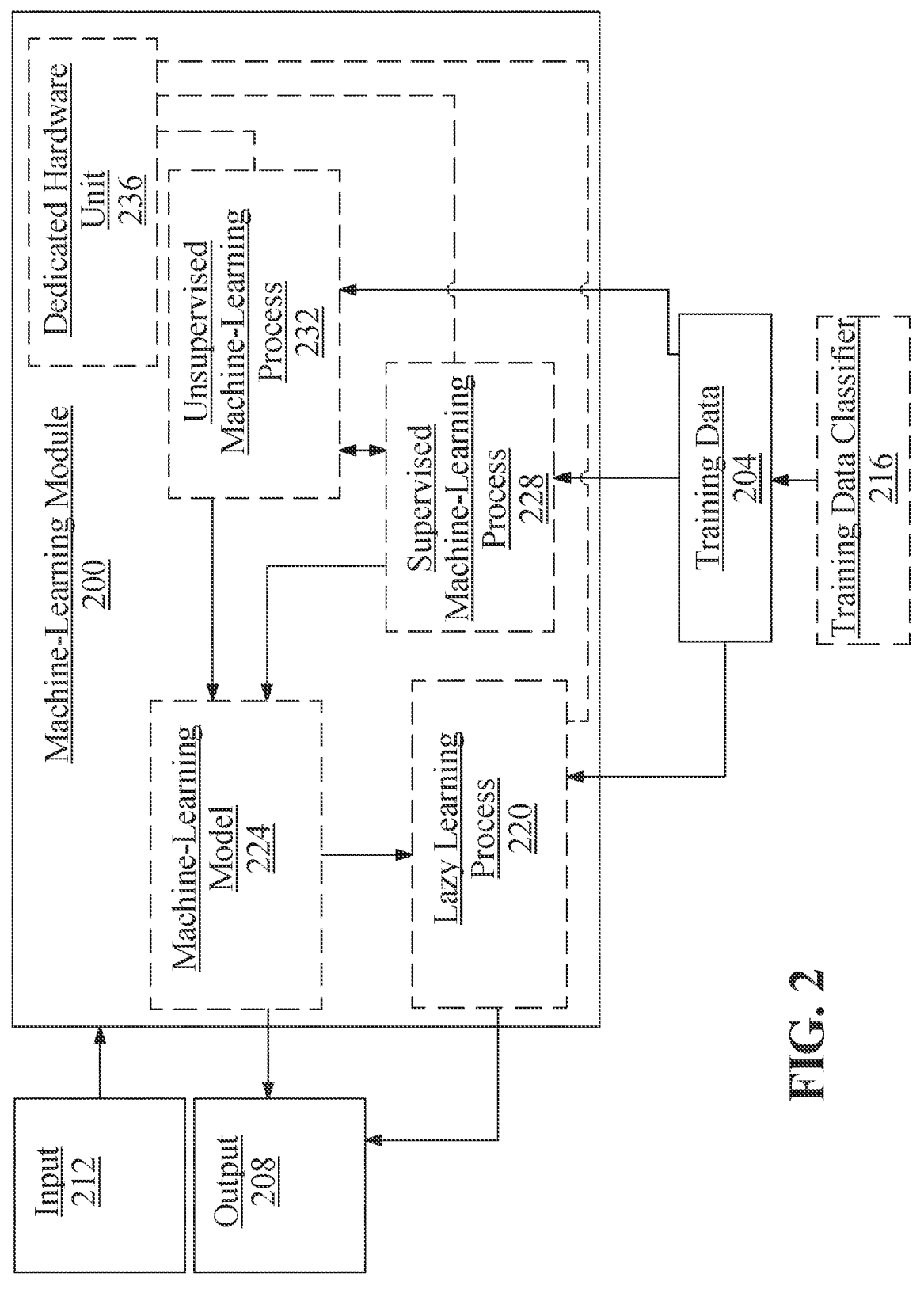
FIG. 2 is a block diagram of an exemplary machine-learning process.

Still referring to FIG. 2, although Naïve Bayes classifier may be primarily known as a probabilistic classification algorithm; however, it may also be considered a generative model described herein due to its capability of modeling the joint probability distribution $P(X, Y)$ over observable variables X and target variable Y. In an embodiment, Naïve Bayes classifier may be configured to make an assumption that the features X are conditionally independent given class label Y, allowing generative model to estimate the joint distribution as $P(X, Y)=P(Y)\Pi iP(Xi|Y)$, wherein $P(Y)$ may be the prior probability of the class, and $P(X_i|Y)$ is the conditional probability of each feature given the class. One or more generative machine learning models containing Naïve Bayes classifiers may be trained on labeled training data, estimating conditional probabilities $P(X_i|Y)$ and prior probabilities $P(Y)$ for each class; for instance, and without limitation, using techniques such as Maximum Likelihood Estimation (MLE). One or more generative machine learning models containing Naïve Bayes classifiers may select a class label y according to prior distribution $P(Y)$, and for each feature $X_i$, sample at least a value according to conditional distribution $P(X_i|y)$. Sampled feature values may then be combined to form one or more new data instance with selected class label y. In a non-limiting example, one or more generative machine learning models may include one or more Naïve Bayes classifiers to generate new examples of output data based on classifications of input data (e.g., example classification labels such as: beginner, intermediate, advanced), wherein the models may be trained using training data containing a plurality of features as input correlated to a plurality of labeled classes as output.

Still referring to FIG. 1, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIG. 2.

With continued reference to FIG. 1, in an embodiment, discriminator may include one or more discriminative models, i.e., models of conditional probability $P(Y|X=x)$ of target variable Y, given observed variable X. In an embodiment, discriminative models may learn boundaries between classes or labels in given training data. In a non-limiting example, discriminator may include one or more classifiers as described in further detail below with reference to FIG. 2 to distinguish between different categories e.g., real vs. fake, or states e.g., TRUE vs. FALSE within the context of generated data such as, without limitations, personalized learning paths, customized user interfaces, or adaptive content delivery algorithms, and/or the like. In some cases, computing device may implement one or more classification algorithms such as, without limitation, Support Vector Machines (SVM), Logistic Regression, Decision Trees, and/or the like to define decision boundaries.

In a non-limiting example, and still referring to FIG. 1, generator of GAN may be responsible for creating synthetic data that resembles real user engagement patterns. In some cases, GAN may be configured to receive input data such as, without limitation, user demographic details, past interaction logs, content preferences, and environmental factors, as input and generates corresponding user behavior models containing information describing or evaluating the performance of one or more user engagement strategies. On the other hand, discriminator of GAN may evaluate the authenticity of the generated content by comparing it to real user engagement patterns, for example, discriminator may distinguish between genuine and generated content and providing feedback to generator to improve the model performance.

With continued reference to FIG. 1, in other embodiments, one or more generative models may also include a variational autoencoder (VAE). As used in this disclosure, a "variational autoencoder" is an autoencoder (i.e., an artificial neural network architecture) whose encoding distribution is regularized during the model training process in order to ensure that its latent space includes desired properties allowing new data sample generation. In an embodiment, VAE may include a prior and noise distribution respectively, trained using expectation-maximization meta-algorithms such as, without limitation, probabilistic PCA, sparse coding, among others. In a non-limiting example, VEA may use a neural network as an amortized approach to jointly optimize across input data and output a plurality of parameters for corresponding variational distribution as it maps from a known input space to a low-dimensional latent space. Additionally, or alternatively, VAE may include a second neural network, for example, and without limitation, a decoder, wherein the "decoder" is configured to map from the latent space to the input space.

In a non-limiting example, and still referring to FIG. 1, VAE may be used by computing device to model complex relationships between input data such as user behavior metrics, which can include session durations, content interaction frequencies, and user feedback scores e.g., user behavior metrics. In some cases, VAE may encode input data into a latent space, capturing essential features such as user engagement trends or content interaction profiles. Such encoding process may include learning one or more probabilistic mappings from observed user metrics to a lower-dimensional latent representation. Latent representation may then be decoded back into the original data space, therefore reconstructing the user behavior metrics. In some cases, such decoding process may allow VAE to generate new examples or variations that are consistent with the learned distributions.

With continued reference to FIG. 1, additionally, or alternatively, one or more generative machine learning models may utilize one or more predefined templates representing, for example, and without limitation, correct user engagement trajectories. In a non-limiting example, one or more engagement blueprints (i.e., predefined models or representations of correct and ideal user interaction patterns, content engagement strategies, and learning pathway outcomes) may serve as benchmarks for comparing and evaluating plurality of user activity logs.

Still referring to FIG. 1, computing device may configure generative machine learning models to analyze input data such as, without limitation, user interaction logs, content engagement rates, and user feedback responses to one or more predefined templates such as ideal user engagement models representing correct user behavior patterns described above, thereby allowing computing device to identify discrepancies or deviations from desired engagement outcomes. In some cases, computing device may be configured to pinpoint specific errors in data like inconsistent user engagement patterns or any other aspects of the user feedback quality. In a non-limiting example, computing device may be configured to implement generative machine learning models to incorporate additional models to detect anomalies in user behavior. In some cases, errors may be classified into different categories or severity levels. In a non-limiting example, some errors may be considered minor, and generative machine learning model such as, without limitation, GAN may be configured to generate recommendations that contain only slight adjustments while others may be more significant and demand more substantial corrections. In some embodiments, computing device may be configured to flag or highlight specific anomalies in user interaction data, altering the user to areas that need attention, directly on the user interface using one or more generative machine learning models described herein. In some cases, one or more generative machine learning models may be configured to generate and output indicators such as, without limitation, visual indicator, audio indicator, and/or any other indicators as described above. Such indicators may be used to signal the detected error described herein.

Still referring to FIG. 1, in some cases, computing device may be configured to identify and rank detected common deficiencies (e.g., gaps in skill development, frequent misunderstandings of certain content, or consistently missed goals) across plurality of data sources; for instance, and without limitation, one or more machine learning models may classify errors in a specific order, such as ranking common misunderstandings in descending order of occurrence frequency. Such ranking process may enable a prioritization of most prevalent issues, allowing instructors or computing device to address these deficiencies more effectively. In a non-limiting example, if a significant percentage of users are consistently struggling with understanding a particular business concept or application feature, this issue may be detected and targeted with specific educational materials or user guidance. The machine learning models may analyze user interactions and feedback to pinpoint the concept or feature causing difficulty, and then generate targeted instructional content, such as explanatory videos or interactive tutorials, to address this common deficiency. By prioritizing the most frequent issues, the computing device ensures that interventions are focused and impactful, enhancing the overall effectiveness of the self-development process.

Still referring to FIG. 1, in some cases, one or more generative machine learning models may also be applied by computing device to edit, modify, or otherwise manipulate existing data or data structures. In an embodiment, output of training data used to train one or more generative machine learning models such as GAN as described herein may include training examples that linguistically or visually demonstrate modified user interaction patterns e.g., altered navigation paths within an application, enhanced content engagement strategies, and/or the like. In some cases, the modified user behavior models may be synchronized with original user action data, for example, and without limitation, in a side-by-side or even overlayed arrangement with the input user action data, providing real-time visual guidance. Additionally, or alternatively, augmented user engagement scenarios may be generated using generative machine learning models to address specific user experience issues. In some cases, such augmented user scenarios may be integrated with the original application interface, offering user a multisensory instructional experience.

Additionally, or alternatively, and still referring to FIG. 1, computing device may be configured to continuously monitor user engagement with educational content. In an embodiment, computing device may configure discriminator to provide ongoing feedback and further corrections as needed to subsequent input data (e.g., user interaction with newly introduced learning modules). In some cases, one or more sensors such as, without limitation, wearable device, motion sensor, or other sensors or devices described herein may provide additional input data like user physiological responses during learning sessions that may be used as subsequent input data or training data for one or more generative machine learning models described herein. An iterative feedback loop may be created as computing device continuously receive real-time data, identify errors as a function of real-time data, delivering corrections based on the identified errors, and monitoring user response on the delivered corrections. In an embodiment, computing device may be configured to retrain one or more generative machine learning models based on changes in user engagement patterns or update training data of one or more generative machine learning models by integrating engagement changes into the original training data. In such embodiment, iterative feedback loop may allow machine learning module to adapt to the user's evolving learning needs and performance, enabling one or more generative machine learning models described herein to learn and update based on user feedback and generated feedback, thus continuously refining and generated feedback.

With continued reference to FIG. 1, other exemplary embodiments of generative machine learning models may include, without limitation, long short-term memory networks (LSTMs), (generative pre-trained) transformer (GPT) models, mixture density networks (MDN), and/or the like. As an ordinary person skilled in the art, upon reviewing the entirety of this disclosure, will be aware of various generative machine learning models may be used.

Still referring to FIG. 1, in a further non-limiting embodiment, machine learning module may be further configured to generate a multi-model neural network that combines various neural network architectures described herein. In a non-limiting example, multi-model neural network may combine LSTM for time-series analysis with GPT models for natural language processing. Such fusion may be applied by computing device to generate [example output data]. In some cases, multi-model neural network may also include a hierarchical multi-model neural network, wherein the hierarchical multi-model neural network may involve a plurality of layers of integration; for instance, and without limitation, different models may be combined at various stages of the network. Convolutional neural network (CNN) may be used for image feature extraction, followed by LSTMs for sequential pattern recognition, and a MDN at the end for probabilistic modeling. Other exemplary embodiments of multi-model neural network may include, without limitation, ensemble-based multi-model neural network, cross-modal fusion, adaptive multi-model network, among others. As an ordinary person skilled in the art, upon reviewing the entirety of this disclosure, will be aware of various generative machine learning models may be used as described herein. As an ordinary person skilled in the art, upon reviewing the entirety of this disclosure, will be aware of various multi-model neural network and combination thereof that may be implemented by apparatus 100 in consistent with this disclosure.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine-learning processes. A "machine-learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example input data may include user engagement metrics such as login frequency, content interaction rates, and time spent on specific tasks within a self-development application. This input data may be correlated with output data representing user progress, such as the achievement of personal goals, improvements in skill assessments, and increased proficiency in targeted development areas. Machine-learning module 200 may use the training data to refine its algorithms, thereby improving the personalization and effectiveness of the development plans generated for the user.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to identify a cohort of users within a business development platform who show a propensity for entrepreneurial activities. Such classification may involve filtering data to include user interactions with content related to startup funding, engagement with market analysis tools, or frequency of access to entrepreneurial resources. This subset of training data may be selected to refine the machine-learning module's capacity to recognize and predict patterns and preferences specific to entrepreneurial users. By focusing on this sub-population, training data may become more relevant and tailored, allowing machine-learning algorithm to learn from a dataset that is representative of users with similar professional development goals. This specificity in training data may enhance the model's predictive accuracy and personalization, as it can more effectively discern the nuances of entrepreneurial behavior. Consequently, this targeted approach improves the functionality of the machine-learning training algorithm, ensuring that the recommendations and resources provided to users are more aligned with their individual business-oriented aspirations, ultimately fostering a more supportive environment for user growth within the scope of this application.

Still referring to FIG. 2, computing device 204 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 204 may then calculate a likelihood table by calculating probabilities of different data entries and classification labels. Computing device 204 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 2, computing device 204 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 2, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 2, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 2, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_m$ in in a set or subset of values subtracted therefrom, with the result divided by the range of the values, give maximum value in the set or subset $X_{max}$:
$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 2, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as output, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
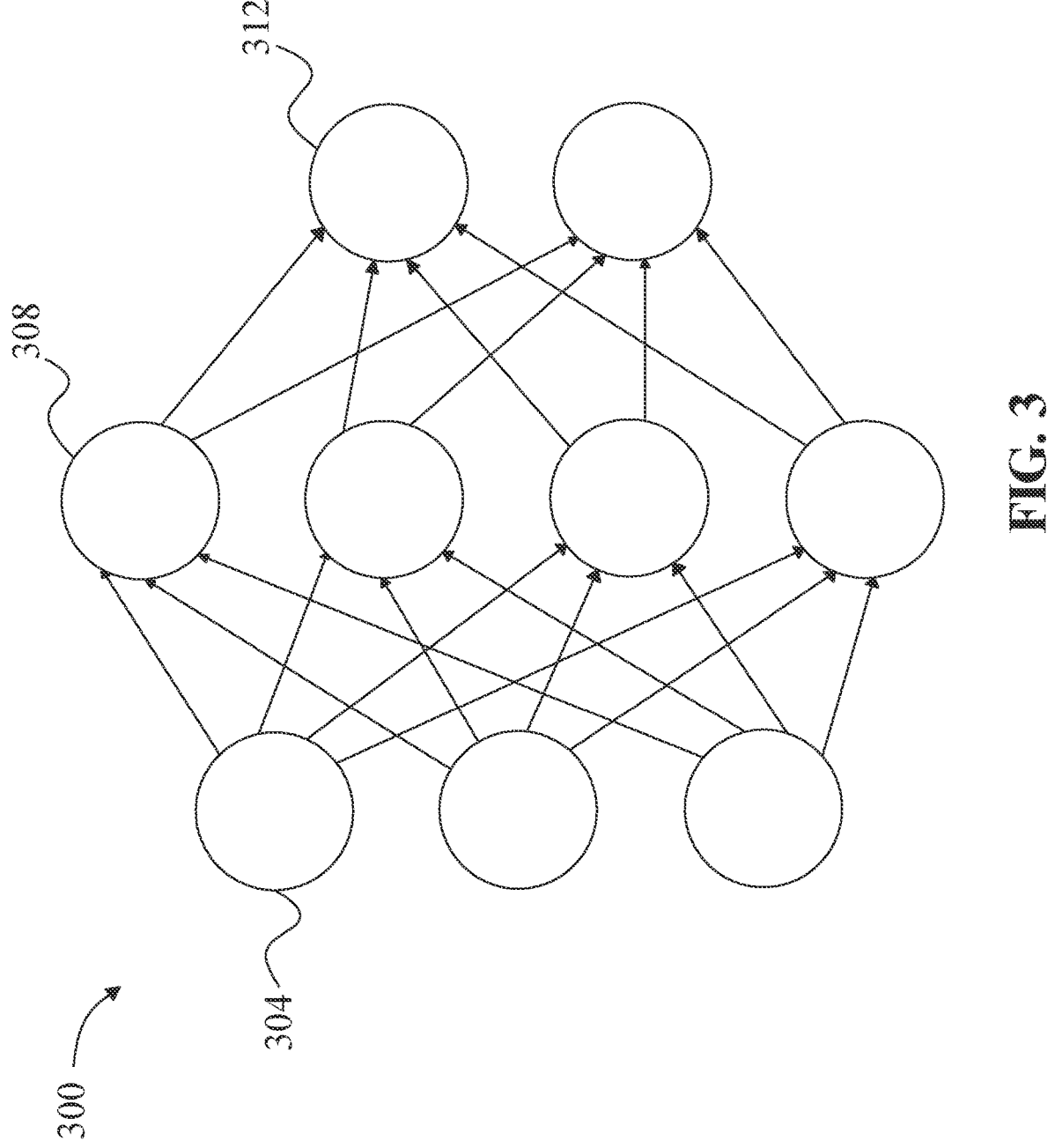
FIG. 3 is a diagram of an exemplary embodiment of neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
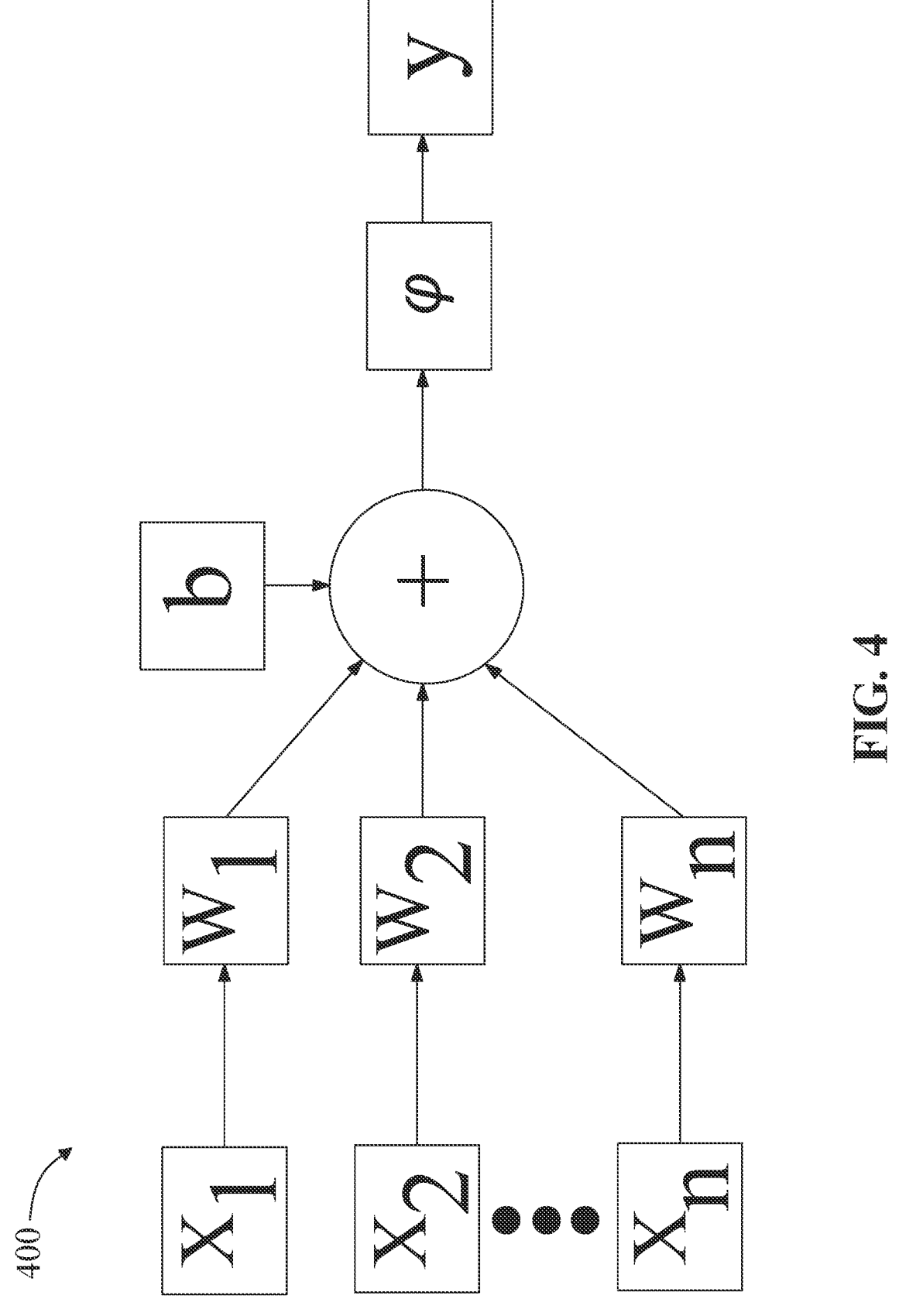
FIG. 4 is a diagram of an exemplary embodiment of a node of a neural network.

Referring now to FIG. 4, an exemplary embodiment of a node ~~00 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x^*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs x, that may be used as activation functions. As a non-limiting and illustrative example, node may perform a weighted sum of inputs using weights w, that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight w, applied to an input x, may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w, may be determined by training a neural network using training data, which may be performed using any suitable process as described above.

Referring now to FIG. 5, a flow diagram of an exemplary method 500 for optimization using dynamically variable local parameters is illustrated. Method 500 includes step 505 of accessing, using at least a processor, a first dataset corresponding to the first phenomenon and a second dataset corresponding to the second phenomenon. This may be implemented, without limitation, as described above with referent 1-4.

With continued reference to FIG. 5, method 500 includes a step 510 of identifying, using the at least a processor, a dependency relationship between at least one data cluster of the first phenomenon and at least one data cluster of the second phenomenon. This may be implemented, without limitation, as described above with reference to FIGS. 1-4.

With continued reference to FIG. 5, method 500 includes a step 515 of modifying, using the at least a processor, an attribute set, as a function of the second data cluster. This may be implemented, without limitation, as described above with referent 1-4.

With continued reference to FIG. 5, method 500 includes a step 520 of optimizing, using the at least a processor, a target data cluster, as the function of the first phenomenon. This may be implemented, without limitation, as described above with referent 1-4.

With continued reference to FIG. 5, method 500 includes a step 525 of modifying, using the at least a processor, the second data cluster as a function of the target data cluster. This may be implemented, without limitation, as described above with referent 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
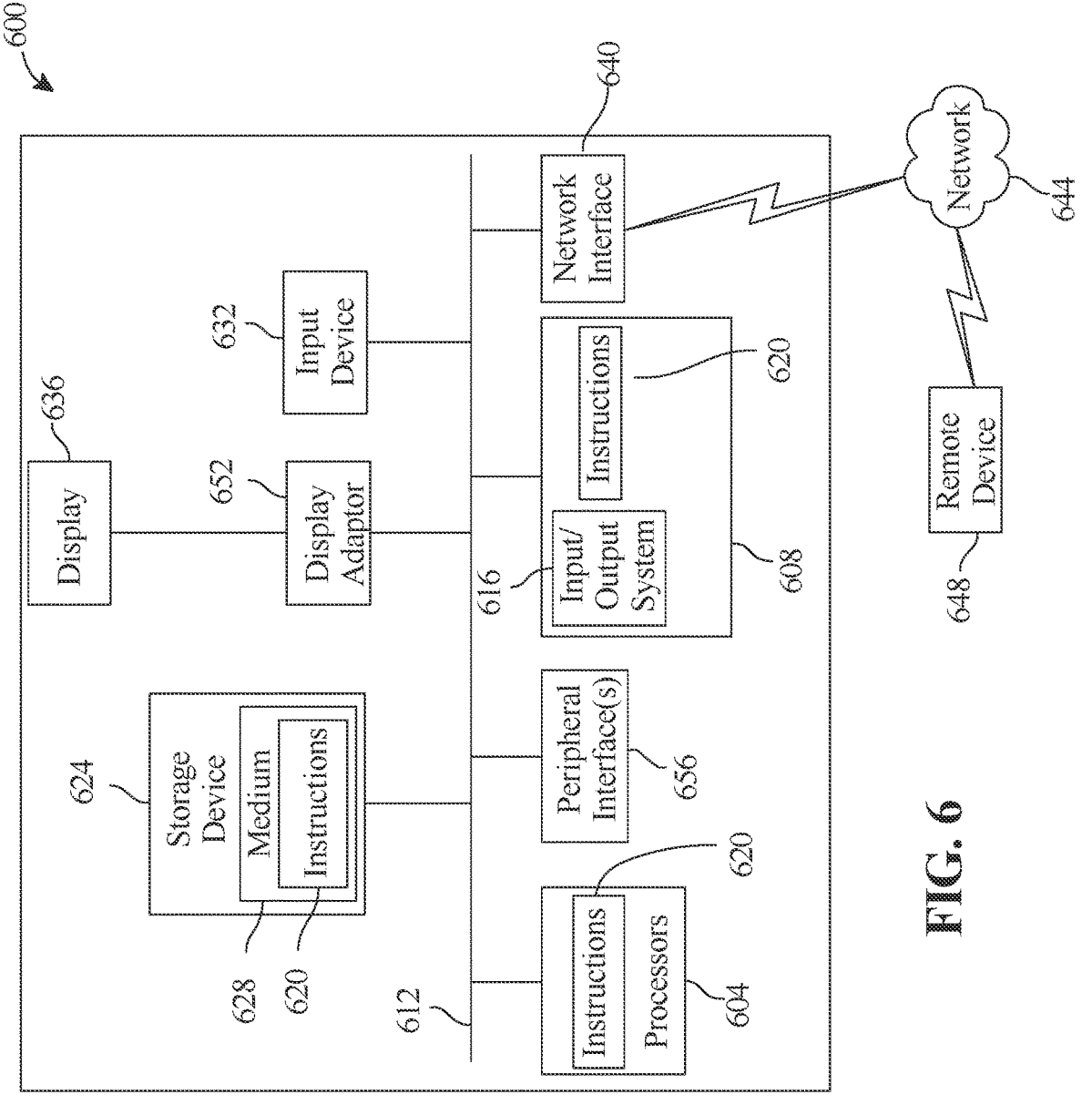
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for optimization using dynamically variable local parameters, wherein the apparatus comprises:
   at least a processor; and
   a memory communicatively connected to the at least a processor, wherein the memory contains instructions configuring the at least a processor to:
      access a first dataset corresponding to a first phenomenon comprising a user behavior and a second dataset corresponding to a second phenomenon comprising an environmental factor, wherein accessing the second dataset further comprises:
         determining the environmental factor using a sensor incorporated in the at least a processor, wherein the environmental factor comprises a location of a user;
      process, using an encoder, the first dataset, wherein the processed first dataset comprises a reduced-dimensionality representation compared to a known input space, wherein the encoder comprises a neural network configured to jointly optimize across input data and output a plurality of parameters corresponding to variational distributions, wherein the reduced-dimensionality representation is used by the at least a processor to dynamically adjust parameters in real time, and wherein a representation comprises at least a feature, wherein the at least a feature comprises at least a user engagement trend;
      identify a dependency relationship between at least one first data cluster of the processed first dataset and at least one second data cluster of the second dataset;
      modify an attribute set of the at least one second data cluster as a function of the dependency relationship, wherein modifying the attribute set comprises generating an objective function;
      optimize a target data cluster as a function of the processed first dataset and the modified attribute set; and
      modify the at least one second data cluster as a function of the target data cluster, wherein modifying the at least one second data cluster comprises determining a user specific behavioral prompt as a function of the processed first dataset using a generative machine-learning model by:
         sanitizing training data to eliminate noise, wherein the training data comprises the processed first dataset, wherein sanitizing the training data comprises:
            determining that at least one training data entry of the training data has a signal to noise ratio below a threshold value; and removing the at least one training data entry from the training data to create sanitized training data;
         training the generative machine-learning model on the sanitized training data until the generative machine-learning model satisfies a convergence test, wherein sanitizing of the training data accelerates convergence of the generative machine-learning model, wherein the generative machine-learning model comprises a generative adversarial network and at least a discriminator, wherein the at least a discriminator comprises a supervised machine-learning model, and wherein the generative adversarial network is configured to generate hypothetical processed first dataset examples as a function of feedback from the at least a discriminator;
         generating the user specific behavioral prompt using the generative machine-learning model;
         updating the sanitized training data with user engagement data corresponding to the user specific behavioral prompt; and
         retraining the generative machine-learning model using the updated sanitized training data.

2. The apparatus of claim 1, further configured to generate the second dataset using a machine-learning process.

3. The apparatus of claim 1, wherein modifying the attribute set includes adding an optimization constraint.

4. The apparatus of claim 1, wherein modifying the attribute set includes removing an optimization constraint.

5. The apparatus of claim 1, wherein generating the objective function further comprises:
   selecting, using a machine-learning model, a variable set; and
   generating the objective function using the selected variable set.

6. The apparatus of claim 1, wherein generating the objective function further comprises:
   receiving a variable set;
   initializing a coefficient set corresponding to the variable set; and
   tuning the coefficient set using a machine-learning algorithm.

7. The apparatus of claim 1, wherein identifying the dependency relationship comprises determining a strength of a correlation between the at least one first data cluster of the processed first dataset and the at least one second data cluster.

8. The apparatus of claim 1, wherein the apparatus is further configured to predict an impact of changes in the at least one second data cluster on the optimization of the target data cluster.

9. The apparatus of claim 8, wherein predicting the impact of changes in the at least one second data cluster further comprises predicting an impact of changes in the at least one first data cluster of the processed first dataset as a function of a hypothetical adjustments to the at least one second data cluster.

10. A method for optimization using dynamically variable local parameters, the method comprising:
   accessing, using at least a processor, a first dataset corresponding to a first phenomenon comprising a user behavior and a second dataset corresponding to a second phenomenon comprising an environmental factor, wherein accessing the second dataset further comprises:

determining the environmental factor using a sensor incorporated in the at least a processor, wherein the environmental factor comprises a location of a user;

processing, using an encoder, the first dataset, wherein the processed first dataset comprises a reduced-dimensionality representation compared to a known input space, wherein the encoder comprises a neural network configured to jointly optimize across input data and output a plurality of parameters corresponding to variational distributions, wherein the reduced-dimensionality representation is used by the at least a processor to dynamically adjust parameters in real time, and wherein a representation comprises at least a feature, wherein the at least a feature comprises at least a user engagement trend;

identifying, using the at least a processor, a dependency relationship between at least one first data cluster of the processed first dataset and at least one second data cluster of the second dataset;

modifying, using the at least a processor, an attribute set, as a function of the dependency relationship, wherein modifying the attribute set comprises generating an objective function;

optimizing, using the at least a processor, a target data cluster, as a function of the processed first dataset and the modified attribute set; and modifying, using the at least a processor, the at least one second data cluster as a function of the target data cluster, wherein modifying the at least one second data cluster comprises determining a user specific behavioral prompt as a function of the processed first dataset using a generative machine-learning model by:

sanitizing training data to eliminate noise, wherein the training data comprises the processed first dataset, wherein sanitizing the training data comprises:

determining that at least one training data entry of the training data has a signal to noise ratio below a threshold value; and removing the at least one training data entry from the training data to create sanitized training data;

training the generative machine-learning model on the sanitized training data until the generative machine-learning model satisfies a convergence test, wherein sanitizing of the training data accelerates convergence of the generative machine-learning model, wherein the generative machine-learning model comprises a generative adversarial network and at least a discriminator, wherein the at least a discriminator comprises a supervised machine-learning model, and wherein the generative adversarial network is configured to generate hypothetical processed first dataset examples as a function of feedback from the at least a discriminator;

generating the user specific behavioral prompt using the generative machine-learning model;

updating the sanitized training data with user engagement data corresponding to the user specific behavioral prompt; and retraining the generative machine-learning model using the updated sanitized training data.

11. The method of claim 10, further comprises generating, using the at least a processor, the second dataset using a machine-learning process.

12. The method of claim 10, wherein modifying the attribute set includes adding an optimization constraint.

13. The method of claim 10, wherein modifying the attribute set includes removing an optimization constraint.

14. The method of claim 10, wherein generating the objective function further comprises:

selecting, using a machine-learning model, a variable set; and generating the objective function using the selected variable set.

15. The method of claim 1, wherein generating the objective function further comprises:

receiving a variable set;

initializing a coefficient set corresponding to the variable set; and tuning the coefficient set using a machine-learning algorithm.

16. The method of claim 10, wherein identifying the dependency relationship comprises determining a strength of a correlation between the at least one first data cluster of the processed first dataset and the at least one second data cluster.

17. The method of claim 10, further comprises predicting, using the at least a processor, an impact of changes in the at least one second data cluster on the optimization of the target data cluster.

18. The method of claim 17, wherein predicting the impact of changes in the at least one second data cluster further comprises predicting an impact of changes in the at least one first data cluster of the processed first dataset as a function of a hypothetical adjustments to the at least one second data cluster.

* * * * *